(12) United States Patent
Abadir et al.

(10) Patent No.: US 8,127,258 B2
(45) Date of Patent: Feb. 28, 2012

(54) DATA PROCESSING DEVICE DESIGN TOOL AND METHODS

(75) Inventors: Magdy S. Abadir, Austin, TX (US); Aseem Gupta, Austin, TX (US); Kamal S. Khouri, Austin, TX (US); Puneet Sharma, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 791 days.

(21) Appl. No.: 12/196,730

(22) Filed: Aug. 22, 2008

(65) Prior Publication Data

US 2010/0050139 A1 Feb. 25, 2010

(51) Int. Cl.
*G06F 17/50* (2006.01)
(52) U.S. Cl. ........ 716/100; 716/106; 716/108; 716/133; 716/134; 716/136
(58) Field of Classification Search .................. 716/100, 716/106–108, 132–136
See application file for complete search history.

(56) References Cited

U.S. PATENT DOCUMENTS

| 6,209,122 | B1 * | 3/2001 | Jyu et al. ........................ 716/113 |
| 6,917,237 | B1 | 7/2005 | Tschanz et al. |
| 2005/0044515 | A1 | 2/2005 | Acar et al. |

OTHER PUBLICATIONS

Liqiong Wei et al.; "Design and OptimiZation of Low Voltage High Performance Dual THreshold CMOS Circuits", in DAC, 1998, 6 pages.
Gupta, P. et al., "Selective Gate-Length Biasing for Cost-Effective Runtime Leakage Control," DAC 2004; Jun. 7-11, 2004; San Diego, CA; 4 pages.

* cited by examiner

*Primary Examiner* — Paul Dinh

(57) ABSTRACT

A method of designing a data processing device design includes determining thermal profile information to indicate a predicted operating temperature for a device instance in the design. The device instance is associated with a first library cell having a relatively high threshold voltage characteristic. A cost function value is determined for the device instance based on the thermal profile information and based on timing information for data paths associated with the device instance. Based on the cost function value, the library cell associated with the device instance can be changed to a cell having a higher threshold voltage characteristic.

20 Claims, 4 Drawing Sheets

DATA PROCESSING DEVICE DESIGN TOOL AND METHODS

BACKGROUND

1. Field of the Disclosure

The present disclosure relates generally to electronic devices and more specifically to the design of electronic devices.

2. Description of the Related Art

Reduction of power consumption in electronic devices, such as integrated circuit devices formed at a common semiconductor substrate, is desirable, especially for devices targeted for low-power applications, such as battery-powered applications. Leakage power consumed by an electronic device can be reduced by reducing the number of low threshold voltage components of the electronic device. However, reducing the number of low threshold voltage components can undesirably increase signal propagation delays at the electronic device.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

A method of designing a data processing device design includes determining thermal profile information to indicate a predicted operating temperature for a device instance in the design. The device instance is associated with a first library cell having a relatively high threshold voltage characteristic. A cost function value is determined for the device instance based on the thermal profile information and based on timing information for data paths associated with the device instance. Because leakage power can increase based on the temperature of a device, the cost function value provides an indication of the relative impact on leakage power of reassigning the device instance to a different library cell. In addition, the cost function value indicates the predicted impact of reassignment on signal propagation delays associated with the device instance. Accordingly, by assigning library cells for device instances of the device design based on cost function values, the leakage power consumed by a device based on the device design can be reduced while ensuring that the device meets a timing specification.

Figure 1:
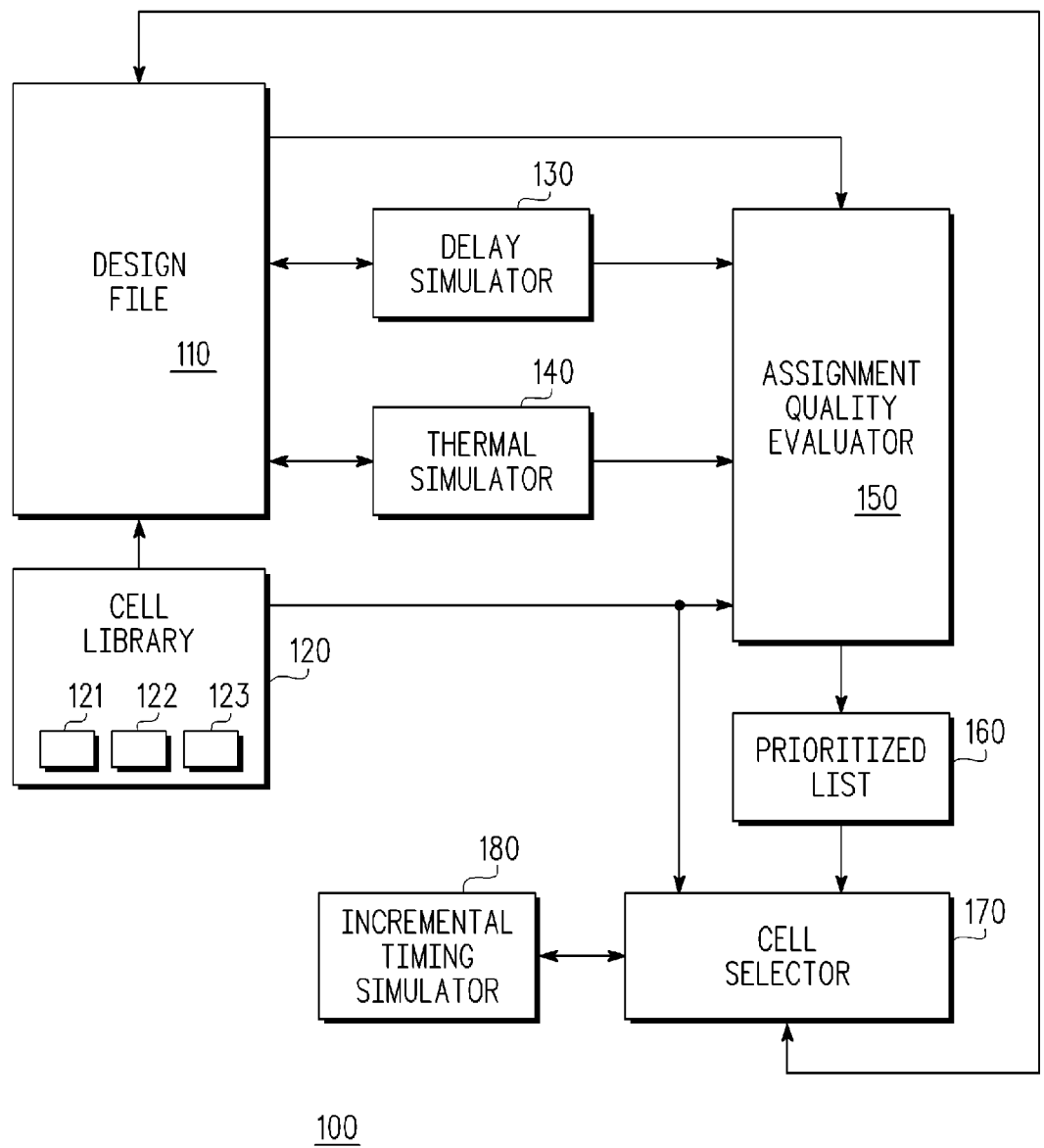
FIG. 1 is a block diagram illustrating a system associated with computer-aided design applications in accordance with a specific embodiment of the present disclosure.

FIG. 1 is a block diagram illustrating a system 100 associated with computer-aided design applications in accordance with a specific embodiment of the present disclosure. System 100 includes a design file 110, a cell library 120, a delay simulator 130, a thermal simulator 140, an assignment quality evaluator 150, a prioritized list 160, a cell selector 170, and an incremental timing simulator 180. Cell library 120 stores library cells, such as library cells 121, 122, and 123.

Design file 110 is connected to cell library 120, to delay simulator 130, to thermal simulator 140, to assignment quality evaluator 150, and to cell selector 170. Cell library 120 is further connected to assignment quality evaluator 150 and to cell selector 170. Delay simulator 130 is further connected to assignment quality evaluator 150. Thermal simulator 140 is further connected to assignment quality evaluator 150. Assignment quality evaluator 150 is also connected to prioritized list 160. Prioritized list 160 is further connected to cell selector 170. In addition, cell selector 170 is connected to incremental timing simulator 180.

Figure 2:
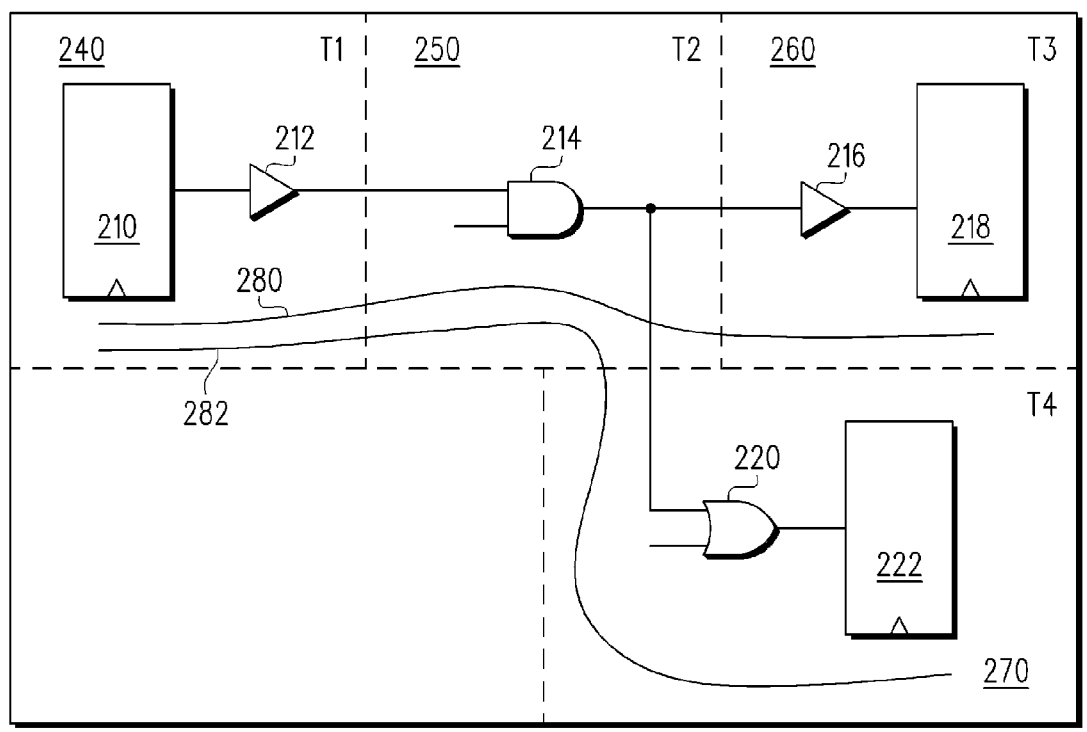
FIG. 2 illustrates a partial block and partial schematic view of a portion of a design represented by a design file of FIG. 1 in accordance with a specific embodiment of the present disclosure.

Design file 110 is information utilized to represent an electronic device design and its attributes. For purposes of discussion, it is assumed that design file 110 represents an electronic device design of electronic device 200, illustrated at FIG. 2. In particular, FIG. 2 illustrates a partial block and partial schematic view of a portion of an electronic device 200, the design of which can be represented by the design file 110. In other embodiments, design file 110 can represent other circuits or devices. Electronic device 200 includes a latch 210, a BUFFER 212, an AND gate 214, a BUFFER 216, a latch 218, an OR gate 220, and a latch 222. Design 200 further includes thermal region 240, labeled "T1," containing latch 210 and BUFFER 212, thermal region 250, labeled "T2," containing AND gate 214, thermal region 260, labeled "T3," containing BUFFER 216 and latch 218, and thermal region 270, labeled "T4," containing OR gate 220 and latch 222.

Also illustrated in FIG. 2 are paths 280 and 282. Path 280 includes latch 210, BUFFER 212, AND gate 214, BUFFER 216, latch 218, OR gate 220, and latch 222. Path 282 includes latch 210, BUFFER 212, AND gate 214, OR gate 220, and latch 222.

Referring again to FIG. 1, design file 110 includes any number of attributes for the electronic device design, such as general connectivity of device elements of paths 280 and 282, and electrical and timing information for the device 200. The design of the electronic device can be altered by creating and modifying the attributes of design file 110. In addition, design file 110 can be used to form the physical electronic device. For example, the attributes stored at design file 110 can be used to manufacture the photolithographic masks used to fabricate the electronic device. A design, such as the design represented in design file 110, will typically include instantiations of library cells included in one or more cell libraries. The instantiations of library cells are referred to herein as "device instances." Accordingly, each device instance is associated with a library cell that defines the behavior of the device instance for simulation. In an embodiment, a device instance can be associated with a library cell by modifying the attributes of the device instance. For example, a device instance defined by the design file 110 can include attributes to indicate characteristics of the instance, such as connectivity with other instances. One such attribute can indicate a pointer or other identifier to a library cell that defines the behavior of the device instance for simulation purposes. For purposes of discussion, modifying the attribute to associate a device instance with a library cell is referred to herein as "assigning" or "reassigning" the library cell to the device instance.

Cell library 120 stores information pertaining to attributes of library cells, such as library cells 121, 122, and 123. Cell attributes can include photo-mask polygon shapes, timing, power, and electrical parameters, functional behavior, and any other information that is useful to designers and design automation tools throughout the design process. The information stored in a library cell can be provided by one or more characterization tools. For example, a circuit simulator such as HSPICE can be used to determine timing, power, and leakage information stored at the cell library 120. The cell library 120 can be published, thereby making the library available for reference by a design.

A specific portion or type of information contained in a cell library can support particular applications using viewpoints or "views." For example, timing information contained in a cell library, and used by a timing simulator, can be referred to as a "timing view" of the cells in the cell library. Similarly, photo-mask information can be referred to as a "layout" view.

Library cells can be classified by logic function, drive capability, timing, or based upon another attribute, and a particular library cell can be included in multiple classifications. For example, an inverter may be available in cells representing devices of different sizes, each size providing a different drive capability and thus exhibiting a different propagation delay when driving a specific load capacitance. Cell library nomenclature can differentiate unique sizes, such as "INVA" or "INVB". A two-input NAND function may be available in a similar number of different sizes, such as "NAND2A" or "NAND2F". For each size of a particular device, there may be additional library cells that differ from one another based upon a particular attribute, such as a physical topology or an electrical property.

One such electrical property is a threshold voltage designated for one or more transistors included at the cell. For example, in the illustrated embodiment of FIG. 1, it is assumed that the cells 121, 122, and 123 represent three different cells associated with an inverter device. The cells 121, 122, and 123 differ based upon the threshold voltage of transistors included in the design of the device associated with the cell. The threshold voltage of a transistor for a cell can be specified and determined by fabrication process implant information identified in a layout view of the cell that includes photo-mask information.

In particular, it is assumed that the cells 121, 122, and 123 represent inverter devices with different threshold voltages, where cell 121 is associated with the lowest threshold voltage among the cells, cell 123 is associated with the highest threshold voltage among the cells, and cell 122 is associated with a threshold voltage between that of cells 121 and 123. For purposes of discussion, cells 121, 122, and 123 can be referred to as cells "INVAL", "INVAM", and "INVAH," respectively. INVAL, INVAM, and INVAH may be substantially similar in every way, such as exhibiting the same logical behavior, except with regard to the threshold voltage attribute associated with each cell.

Threshold voltage variations that are available for a particular library cell enable designers and design automation tools to perform design adjustments. For example, in one embodiment, a high threshold voltage variation of a library cell is assumed to have a greater propagation delay, and thus be slower, than a low threshold voltage variation of that cell. However, the high threshold voltage variation is assumed to exhibit less charge leakage than the low threshold voltage variation. As described further herein, a design automation tool can select between library cells for a designated device instance to reduce delay associated with the device instance, but do so at a cost of increasing the power dissipation associated with the device instance.

Timing simulator 130 is a design automation application tool used to predict the speed at which a manufactured product associated with the design file 110 will operate. In particular, a typical design is synchronous and can be divided into individual timing paths, such as paths 280 and 282 of FIG. 2. A timing path includes one or more combinatorial devices, connected between two synchronous devices, such as latches or flip flops. The combinatorial and synchronous devices are device instances that are included in one or more cell libraries, such as cell library 120. To predict timing information for each path, the timing simulator 130 can access pre-characterized cell timing information available in cell library 120. The propagation delay of the combinatorial devices indicated by each cell, in addition to clock-to-output delays and setup delays of the synchronous devices as indicated by the associated cells, determine a path delay for each path. The path delay can take into account the temperature of each device instance in the path when calculating the delay contributed by that device instance. Due to path branching, a particular device instance may be included in more than one path.

For purposes of discussion herein, a path with a path delay that exceeds a specified goal is said to "fail" timing, and the amount of time by which the path delay exceeds the path delay goal is referred to as the amount of "negative slack." In addition, for purposes of discussion herein, a path with a path delay that is less than a specified goal is said to "pass" timing, and the amount of time by which the path delay surpasses the path delay goal is referred to as the amount of "positive slack". The timing simulator 130 provides timing information, such as slack information for each device instance in the design file 110. Further, the timing simulator 130 determines the slack associated with a particular device instance based on the path with the worst path slack (most negative or least positive) of all paths that include that device instance. As described further herein, device instances associated with paths having positive slack are candidates for re-assignment to a cell having a higher threshold voltage variation, if such a cell is available.

Thermal simulator 140 is a design automation application tool used to predict and profile the operating temperature of localized regions of the manufactured device associated with design file 110. The thermal profile can be determined using static or dynamic simulation techniques and can take into account information such as switching activity, node capacitance, operating frequency, device leakage, and substrate and packaging heat transfer characteristics. Thermal simulator 140 predicts the operating temperature of each device instance of the design. The propagation delay of a cell increases with increasing cell temperature, and the leakage of that cell increases at an even greater rate. In other embodiments, the thermal simulator 140 can determine thermal information based on physical measurements of an existing device.

Assignment quality evaluator 150 provides a quantitative assessment of the reassignment desirability of each device instance of the design. For purposes of discussion herein, reassignment refers to changing the association of a device instance in design file 110 from one library cell to another. In particular, the amount of power that is dissipated by a device due to transistor charge leakage can be reduced by reducing the number of lower threshold voltage transistors. Accordingly, the assignment quality evaluator 150 can identify device instances in a device design that currently reference lower threshold voltage variations of a cell, and indicate the cell associated with the device instance can be reassigned to higher threshold voltage cell. Assignment quality evaluator 150 is therefore configured to provide a quantitative assessment of the reassignment desirability of an instance of the design based on thermal information associated with the instance as well as timing information for one or more paths associated with the device.

Assignment quality evaluator 150 provides the reassignment desirability in the form of an AssignmentQuality value, which is a cost function value based on a defined cost function. The AssignmentQuality value is calculated for each device instance in the design that has positive slack, and indicates how much savings in leakage power and how much negative impact on the path delay of surrounding paths would occur if that device instances was reassigned to a higher threshold voltage variation of the cell.

The AssignmentQuality cost function can be expressed by the equation:

$$AssignmentQuality = \frac{(\Delta Leakage)(Slack - \Delta Delay)(Temperature)}{\Delta Delay}$$

where "$\Delta$Leakage" represents a reduction in charge leakage that will occur if a device instance is reassigned, to reference a particular higher voltage threshold variation of that cell, "Slack" represents an amount of slack associated with the original device instance, "$\Delta$Delay" represents an increase in cell propagation delay resulting from the particular reassignment, and "Temperature" represents the predicted or measured temperature of the original device instance.

The assignment quality evaluator 150 calculates $\Delta$Leakage, Slack, and $\Delta$Delay for each device instance in the design file 110 that has positive slack, as indicated by delay simulator 130, and each is calculated using the input signal transition and output load capacitance associated with the original device instance provided by the design file 110, and propagation and leakage information provided by the cell library 120. The assignment quality evaluator 150 calculates an AssignmentQuality value for each device instance, and records each value, along with an indicator of the associated device instance in prioritized list 160. The listed device instances are ranked with other device instances in an order of highest to lowest AssignmentQuality. In an embodiment, if the calculated AssignmentQuality of a specific device instance, given a particular reassignment, is negative, then that device instance is not recorded in prioritized list 160.

The operation of the assignment quality evaluator can be better understood with reference to the example of FIG. 2. Each of devices 210-222 illustrated at FIG. 2 is assumed to be an device instance associated with a particular library cell that is included in cell library 120. Timing simulator 130 calculates a predicted path delay for paths 280 and 282, and each of device instances 210-222 are associated with a slack value based on the encompassing paths. For example, if path 280 has a slack of 0.5 ns and path 282 has a slack of 0.7 ns, then device instances 210, 214, and 216 will be designated to have a slack of 0.5 ns, and device instance 220 will be designated to have a slack of 0.7 ns. Note that latches 210, 218, and 222 can also be considered for reassignment in a specific embodiment of the present disclosure.

Thermal simulator 140 predicts and profiles the operating temperature of localized regions of device 200 and determines an operating temperature for each device instance. For example, thermal region 240, and thus latch 210 and BUFFER 212, may be determined to be at a temperature of 82 degrees Celsius, thermal region 250, and thus AND gate 214, at a temperature of 89 degrees Celsius, thermal region 260, and thus BUFFER 216 and latch 218, at a temperature of 92 degrees Celsius, and thermal region 270, and thus OR gate 220 and latch 222, at a temperature of 89 degrees Celsius.

Because the slack associated with each of device instances 212, 214, 216, and 220 is positive, assignment quality evaluator 150 can calculate an AssignmentQuality for each device. A hypothetical example follows. Assume BUFFER 212 and AND gate 214 are both low threshold voltage variations of their particular type and size of cell. BUFFER 212 is reassigned to a high threshold voltage variation of that cell type, and an AssignmentQuality value of "5.7" is calculated. AND gate 214 is reassigned to a high threshold voltage variation of that cell type, and an AssignmentQuality value of "7.1" is calculated. AND gate 214 would therefore be placed higher in priority list 160 than BUFFER 212. It is determined that BUFFER 216 already references the highest threshold voltage variation available for that particular cell type, and thus no reassignment is possible, no AssignmentQuality is calculated, and device instance 216 is not included in priority list 160. OR gate 220 is now considered. OR gate 220 is reassigned to a higher threshold voltage variation of that cell type, and an AssignmentQuality value of "–2.5" is calculated. A negative AssignmentQuality value is calculated because when the higher threshold voltage variation of that cell is considered, the resulting increase in propagation delay is greater than the amount of slack associated with the original device instance, so (Slack–$\Delta$Delay), and thus AssignmentQuality, is a negative value. No reassignment of OR gate 220 is possible, and OR gate 220 is not included in prioritized list 160.

Cell library 120 may include more than two threshold voltage variations for some types of devices. When a device instance is evaluated be assignment quality evaluator 150 for potential reassignments, a replacement cell with a highest threshold voltage is first considered. If the AssignmentQuality value calculated for that cell is negative, an intermediate threshold voltage cell variation, if available, can be evaluated.

Returning to FIG. 1, cell selector 170 receives prioritized list 160 and, based on the list, associates device instances with cells having a lower threshold voltage by changing the appropriate information at the design file 110 In particular, cell selector 170 progresses through priority list 160, starting with the highest priority device instance and continuing with device instances with decreasing priority. For each device instance, the cell selector reassigns the library cell associated with the device instance to a cell having a higher voltage threshold. Cell selector 170 performs the selected cell reassignment indicated by priority list 160 in a virtual "snapshot" of a portion of the design contained in design file 110. The snapshot need only contain information and views from design file 110 that relate to paths associated with the device instances that are presently being reassigned. Incremental timing simulator 180 evaluates the timing of each path that includes a reassigned device instance. If incremental timing simulator 180 determines that a path no longer meets the specified timing goal, then a device instance is reverted to its originally assigned library cell. If incremental timing analysis indicates that a particular device instance reassignment was successful (e.g., the path containing the device instance is determined to meet the specified timing goal), the device instance reassignment can be reflected in design file 110.

Figure 3:
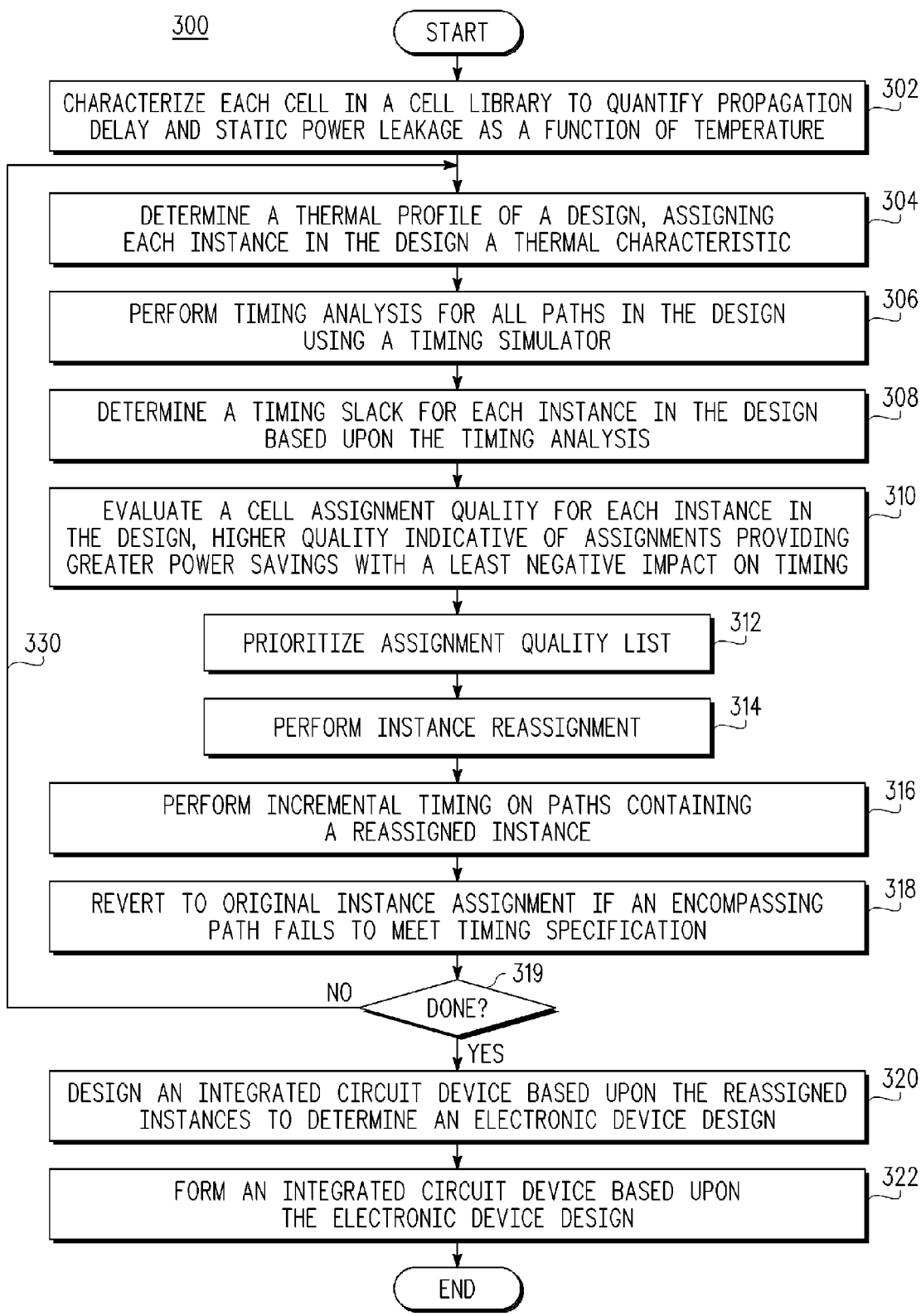
FIG. 3 is a flow diagram illustrating a method in accordance with at least one embodiment of the present disclosure.

FIG. 3 is a flow diagram illustrating a method 300 for use with the design system of FIG. 1, in accordance with at least one embodiment of the present disclosure. At block 302, each cell in cell library 120 is characterized by circuit simulator tools to quantify the propagation delay and static power leakage as a function of temperature. A range of signal transition times and cell output loads are typically included in the analysis, and the results are stored in the cell library in the form of a lookup table or in another way that allows a design simulation tool to predict the behavior of a cell when it is instantiated in a particular design context.

At block 304, thermal simulator 140 determines a thermal profile of the design represented in design file 110, assigning each device instance in the design file 110 a thermal characteristic, such as an operating temperature. At block 306, delay simulator 130 performs a timing analysis for all paths of the design. In another embodiment, timing simulation may be performed prior to the thermal analysis. At block 308, a timing slack is determined for each device instance of the design. At block 310, assignment quality evaluator 150 determines an AssignmentQuality for each device instance in the design, where higher values are indicative of assignments that provide greater power savings with a least negative impact on the timing of the associated path. At block 312, each device instance that has a positive AssignmentQuality is included in priority list 160 in descending order of quality values.

At block 314, cell selector 170 evaluates each reassignment, in the priority order specified by priority list 160. At block 316, incremental timing simulator 180 simulates the timing of each path that contains a reassigned device instance. At block 318, a cell reassignment is reverted back to its original assignment if an encompassing path fails to meet the timing specification of the design. If the cell reassignment is not reverted to the original assignment, the design file 110 is updated to reflect the new cell assignment. At block 319, the system 100 determines whether another reassignment process should be initiated. In an embodiment, the determination is made based on a trade-off between increased design and testing time versus improvements in design quality. If the system determines that another reassignment process is desired, the method returns to block 304 and another thermal profile, based on the reassigned device instances, is determined. If it is determined, at block 319, that another reassignment process is not desired, the method proceeds to block 320, and an electronic device design is determined based on the revised design file. At block 322, the electronic device design can used to form an integrated circuit device.

The reassignment procedure illustrated at FIG. 3 can be performed on all device instances of design file 110, or on a selected subset. In particular a single device instance from the top of priority list 160 can be considered, the reassignment validated by incremental timing simulator 180, and the reassignment reflected in design file 110 if the timing is found acceptable. The next device instance from priority list 160 is then considered in the same way as the first. The procedure can continue until cell selector 170 has processed all, or a portion, of the device instances contained in priority list 160.

Alternatively, a group of selected device instances, corresponding to a set of device instances having a priority greater than the remaining device instances of priority list 160, can be processed in parallel. The suggested reassignments are completed for all device instances in the group, incremental timing is performed, and any required reassignments are reversed. A next group of device instances, corresponding to a new set of device instances having the highest priority of the device instances remaining in priority list 160, can be processed in the same way.

At a particular time, after all, or a portion, of the device instances in priority list 160 have been processed by cell selector 170, and design file 110 has been updated to reflect new device instance assignments, delay simulator 130 can again evaluate the current state of the design with regard to timing. Feedback loop 330 begins the procedure again at block 304 where a new thermal profile of the design can also be calculated using thermal simulator 140. Because a portion of the device instances of the design may have been reassigned to cells with higher threshold voltages, the new thermal profile can indicate localized areas of the design may be cooler than when originally calculated. As a result, additional positive slack in the paths of the design file 110 may be available. Assignment quality evaluator 150 can once again identify reassignment candidates, and provide prioritized list 160 containing these candidates to cell selector 170. The reassignment process can thus be repeated until a desired number of device instances have been reassigned.

Figure 4:
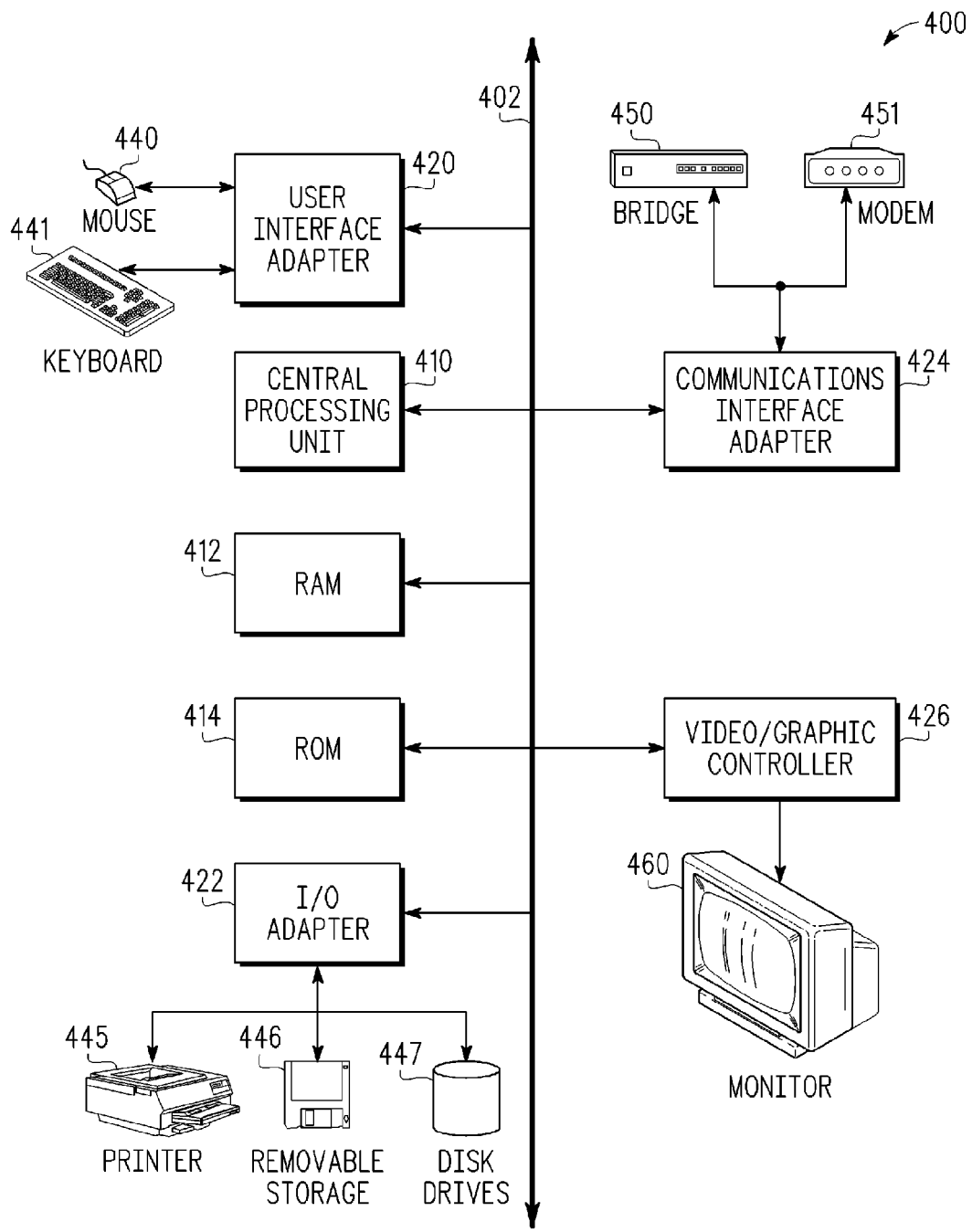
FIG. 4 is a block diagram of a particular embodiment of a data processor device in accordance with at least one embodiment of the present disclosure.

FIG. 4 illustrates, in block diagram form, a processing device in the form of a computer system 400. The computer system 400 is illustrated to include devices connected to each other and including a central processing unit 410, which may be a conventional proprietary data processor, memory including random access memory 412, read only memory 414, and input output adapter 422, a user interface adapter 420, a communications interface adapter 424, and a multimedia controller 426.

The input output (I/O) adapter 426 is further connected to, and controls, disk drives 447, printer 445, removable storage devices 446, as well as other standard and proprietary I/O devices.

The user interface adapter 420 can be considered to be a specialized I/O adapter. The adapter 420 is illustrated to be connected to a mouse 440, and a keyboard 441. In addition, the user interface adapter 420 may be connected to other devices capable of providing various types of user control, such as touch screen devices.

The communications interface adapter 424 is connected to a bridge 450 such as is associated with a local or a wide area network, and a modem 451. By connecting the system bus 402 to various communication devices, external access to information can be obtained.

The multimedia controller 426 will generally include a video graphics controller capable of displaying images upon the monitor 460, as well as providing audio to external components (not illustrated).

Generally, the system 400 will be capable of implementing the system and methods described herein. For example, the design file to be analyzed by the method described herein can be stored at disk drive 447 and accessed by the CPU 410 in response to an instruction. In other embodiments, the methods described herein can be performed by other computer systems, and can be performed by multiple computer systems working together.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method, comprising:
   identifying at a computer device a first device instance in a design file representative of an electronic device design, the first device instance representing a first device;
   associating the first device instance with a first library cell in response to identifying the first device instance;
   determining a first thermal characteristic of the first device instance, the first thermal characteristic indicating a simulated temperature associated with predicted operation of the first device;
   determining a first slack value based on a first signal propagation delay of a first simulated path associated with the first device instance, the first slack value based on the first library cell; and
   associating the first device instance with a second library cell based on the first thermal characteristic and the first slack value.

2. The method of claim 1, wherein the first library cell is associated with a first threshold voltage characteristic and the second library cell is associated with a second threshold voltage characteristic.

3. The method of claim 1, further comprising:
   identifying a second device instance in the design file, the second device instance representing a second device;
   determining a second thermal characteristic of the second device instance indicating a simulated temperature associated with the second device;
   determining a second slack value based on a second signal propagation delay of a second simulated path associated with the second device instance;
   determining a first cost function value based on the first thermal characteristic and the first slack value;
   determining a second cost function value based on the second thermal characteristic and the second slack value; and
   wherein associating the first device instance with the second library cell comprises associating the first device instance with the second library cell based on a relationship between the first cost function value and the second cost function value.

4. The method of claim 3, wherein determining the first cost function value comprises:
   determining a leakage power difference based on a difference between a leakage power associated with the first library cell and a leakage power associated with the second library cell; and
   determining the first cost function value based on the leakage power difference.

5. The method of claim 3, wherein determining the first cost function value comprises:
   determining a delay difference based on a first signal delay associated with the first library cell and a first signal delay associated with the second library cell; and
   determining the first cost function value based on the delay difference.

6. The method of claim 5, wherein determining the first cost function value comprises:
   determining a delay difference based on a first signal delay associated with the first library cell and a first signal delay associated with the second library cell;
   subtracting the delay difference from the slack value to determine a first result;
   multiplying the first result with the leakage power difference to determine a second result;
   multiplying the second result with the first thermal characteristic to determine a third result; and
   determining the first cost function value by dividing the third result with the delay difference.

7. The method of claim 1, further comprising:
   determining, in response to associating the first device instance with the second library cell, a second slack value based on a second signal propagation delay of the first simulated path, the second signal propagation delay based on the second library cell; and
   associating the first device instance with the first library cell in response to the second slack value exceeding a threshold.

8. The method of claim 1, wherein the first thermal characteristic is based on the first library cell, and further comprising determining a second thermal characteristic of the first device instance based on the second library cell.

9. The method of claim 1, further comprising:
   determining a second slack value based on a second signal propagation delay of the first simulated path associated with the first device instance, the first slack value based on the second library cell; and
   associating the first device instance with a third library cell based on the second thermal characteristic and the second slack value.

10. The method of claim 1, wherein the electronic device design comprises a design for a data processor.

11. The method of claim 1, further comprising:
    designing an integrated circuit device based on the associating the first device instance with the second library cell to determine the electronic device design.

12. The method of claim 11, further comprising:
    forming an integrated circuit device based on the electronic device design.

13. A method, comprising:
    determining at a computer device a first cost function value for a first device instance representing a first device of an electronic device design, the first cost function value based on a first thermal characteristic of the first device instance and based on a first slack value associated with a signal propagation delay of a first simulated path associated with the first device instance, the first thermal characteristic indicative of a simulated operating temperature of the first device;
    selecting a first library cell of a plurality of library cells based on the first cost function value; and
    associating the first device instance with the first library cell.

14. The method of claim 13, further comprising:
    determining a second cost function value for second device instance representing a second device of the electronic device design, the second cost function value based on a second thermal characteristic of the second device instance and based on a second slack value associated with a signal propagation delay of a second simulated path associated with the second device instance; and
    wherein selecting the first library cell comprises selecting the first library cell in response to determining a first relationship between the first cost function value and the second cost function value.

15. The method of claim 13, wherein selecting the first library cell comprises selecting the first library cell in response to determining a first relationship between the first cost function value and a plurality of cost function values, each of the plurality of cost function values associated with a device instance of the electronic device design.

16. The method of claim 13, further comprising:
determining a second thermal characteristic of the first device instance, the second thermal characteristic based on the first library cell;
determining a second cost function value for the first device instance, the second cost function value based on the second thermal characteristic of the first device instance and based on a first slack value associated with a signal propagation delay of a first simulated path associated with the first device instance;
selecting a second library cell of the plurality of library cells based on the second cost function value; and
associating the second device instance with the second library cell.

17. A non-transitory computer readable medium tangibly embodying a plurality of instructions to manipulate a processor, the plurality of instructions comprising instructions to:
identify a first device instance in a design file representative of an electronic device design, the first device instance representing a first device of the electronic device design;
associate the first device instance with a first library cell;
determine a first thermal characteristic of the first device instance, the first thermal characteristic indicating a simulated operating temperature associated with the first device;
determine a first slack value based on a first signal propagation delay of a first simulated path associated with the first device instance, the first slack value based on the first library cell; and
associate the first device instance with a second library cell based on the first thermal characteristic and the first slack value.

18. The computer readable medium of claim 17, wherein the first library cell is associated with a first threshold voltage characteristic and the second library cell is associated with a second threshold voltage characteristic.

19. The computer readable medium of claim 17, wherein the plurality of instructions further comprise instructions to:
determine, in response to associating the first device instance with the second library cell, a second slack value based on a second signal propagation delay of the first simulated path, the second signal propagation delay based on the second library cell; and
instructions to associate the first device instance with the first library cell in response to the second slack value exceeding a threshold.

20. The method of claim 17, wherein the first thermal characteristic is based on the first library cell, and wherein the plurality of instructions further comprise instructions to determine a second thermal characteristic of the first device instance based on the second library cell.

* * * * *